Figures 1, 6:
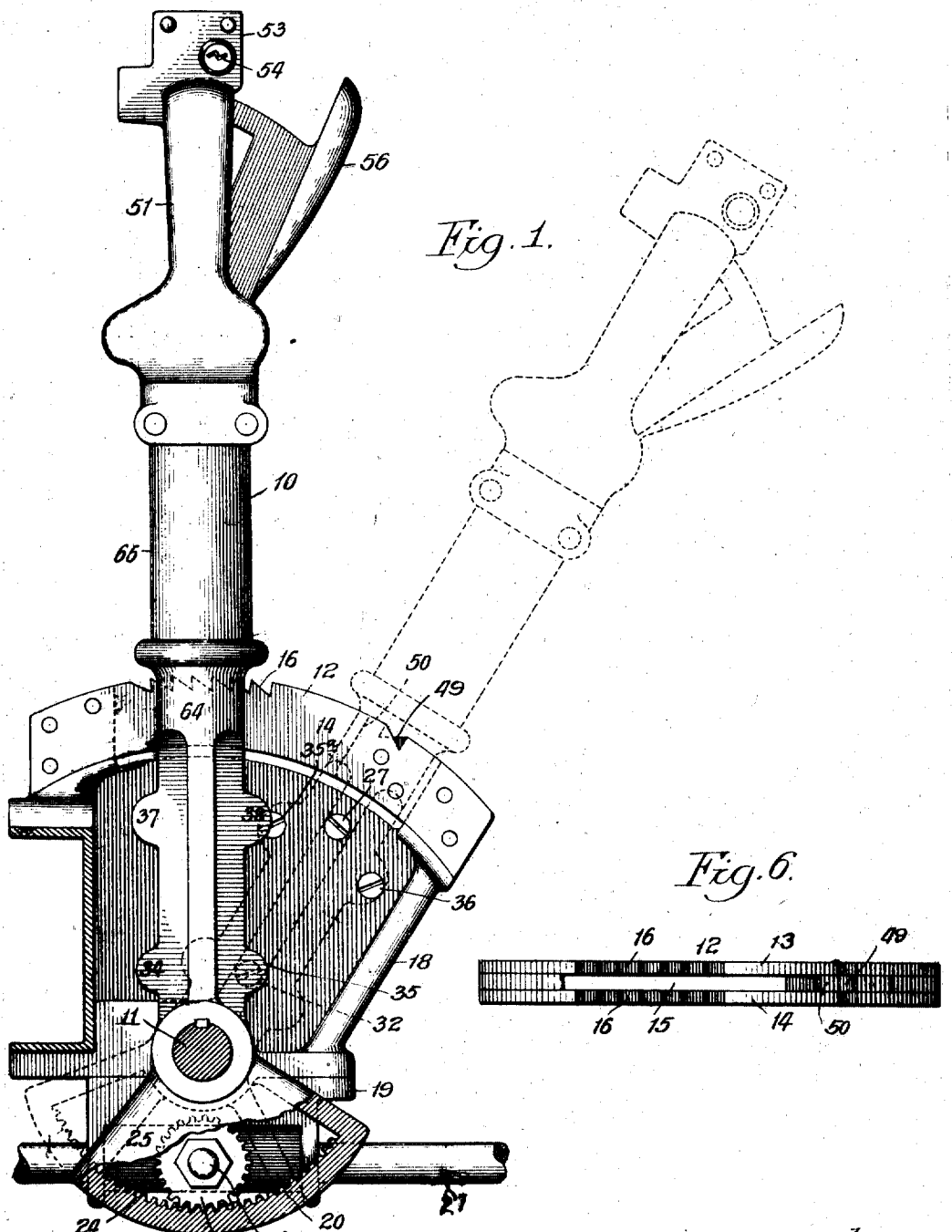

C. A. BICKFORD.
LEVER LOCKING DEVICE.
APPLICATION FILED FEB. 28, 1917.

1,236,396.

Patented Aug. 14, 1917.
3 SHEETS—SHEET 1.

Witness:
John Enders.

Inventor:
Charles A. Bickford,
by George Manker
Atty.

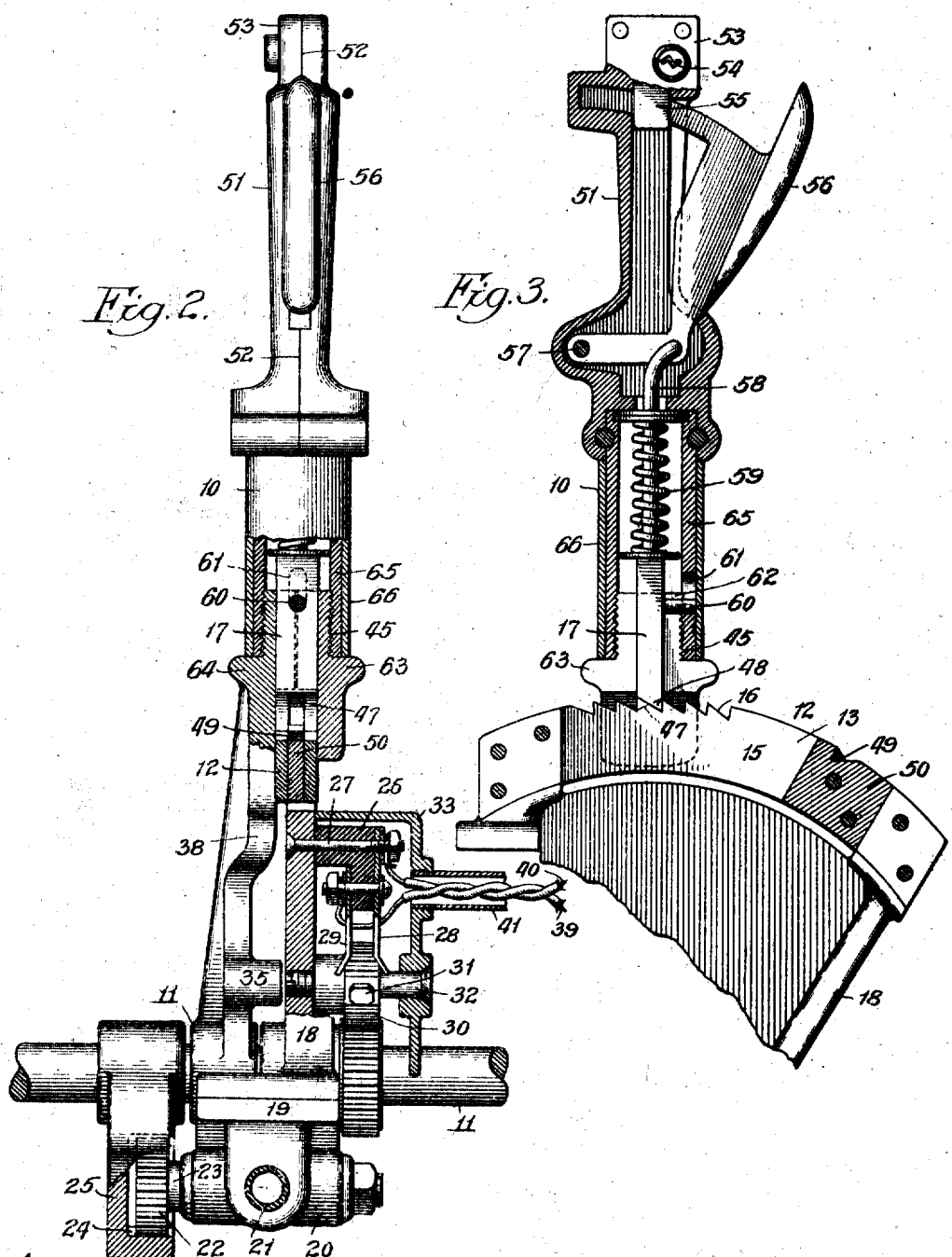

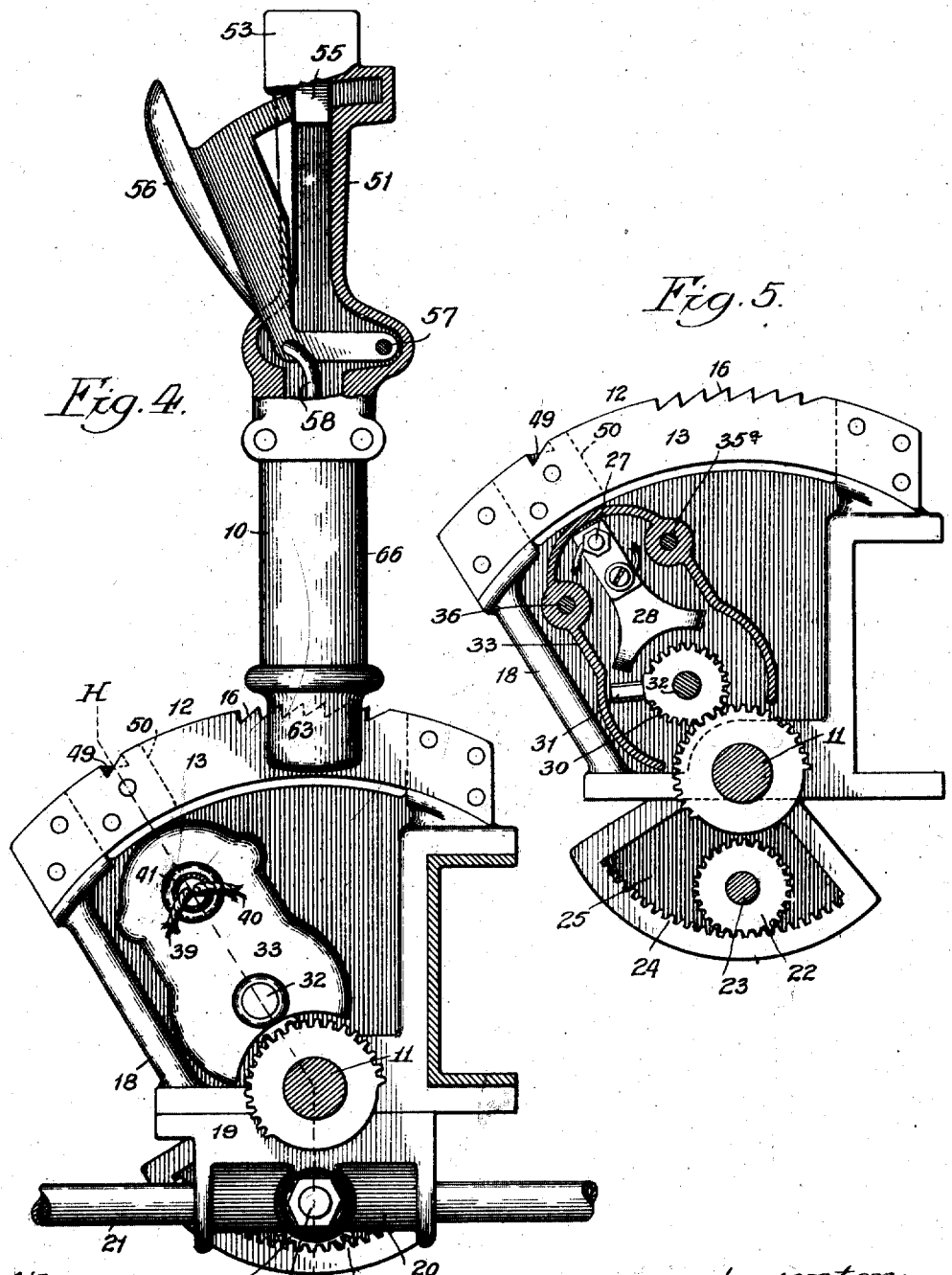

UNITED STATES PATENT OFFICE.

CHARLES A. BICKFORD, OF CHICAGO, ILLINOIS.

LEVER-LOCKING DEVICE.

1,236,396.  Specification of Letters Patent.  Patented Aug. 14, 1917.

Application filed February 28, 1917. Serial No. 151,442.

*To all whom it may concern:*

Be it known that I, CHARLES A. BICKFORD, a citizen of the United States, residing at Chicago, in the county of Cook and State of Illinois, have invented a certain new and useful Lever-Locking Device, of which the following is a full, clear, and exact description, reference being had to the accompanying drawings, which form a part of the specification.

The object of my invention is to provide a locking mechanism to be applied to automobiles of either the commercial or pleasure type, which, when applied, makes it possible to leave the machine in the street, garage or elsewhere positively locked against loss by theft or otherwise.

A further object of my invention is to provide a locking mechanism which will not only lock the emergency brake lever but will simultaneously, if desired, operate to disconnect the electric circuit wires and also to shut off the gasolene supply.

A further object of my invention is to provide a locking mechanism which will permit the breaking of the electric circuit and shutting off the gasolene supply so that the car can not be operated by its own power, and at the same time leave it so that in case of fire, the machine can be rolled out of the garage to safety.

Still another object of my invention is to provide such an arrangement of parts in my locking mechanism as to prevent dismantling or tampering with the locking mechanism so as to release same.

Referring to the accompanying drawings, Figure 1 is a side elevation of the emergency brake lever of an automobile having my locking mechanism applied thereto. Fig. 2 is a front elevation, part of which is shown in section. Fig. 3 is a central, vertical section. Fig. 4 is a side elevation showing the side opposite to Fig. 1. Fig. 5 is a detailed section view of part of Fig. 4. Fig. 6 is a sectional detail on lines H H of Fig. 2.

Referring to the details of my invention shown in the drawings, 10 represents an emergency brake lever of the automobile which is fulcrumed at 11 and carries the necessary locking and brake mechanism for setting the brakes and engaging or disengaging the locking mechanism. The sector 12 is composed of two parts, 13 and 14 forming a slot 15 wherein the lever 10 is guided in its movement. The sector or quadrant has a series of notches 16 with which the pawl 17 engages. To the bracket 18 is secured a flange 19 which carries a gasolene valve of the three way cock type made to close when the lever is at either end of the notched quadrant 12 whether in backward or extreme forward position.

When the emergency brake lever 10 is in position to release the brakes and permit the engagement of clutch or other mechanism, the valve 20 is opened and the gasolene turned on. This valve 20 in the line 21 leading to the motor has a pinion gear 22 secured to the stem 23 so as to engage a quadrant ratchet 24 which may be cast on the lever 10 or otherwise fulcrumed on shaft 11 the same as the upper portion of the lever 10. A web 25 covers this pinion 23 when the whole device is assembled so as to prevent its being dismantled or tampered with. My device also provides for lever control of the ignition circuit to the motor of the vehicle. This switch is best shown in Figs. 2, 4 and 5 of my drawings. It is assembled on the cast web of the bracket 18 and when the lever 10 is at either end of the notched quadrant 12 in either extreme forward or backward position, the electric circuit to the motor is opened or broken. For this purpose any commercial switch of the circuit breaking or snap type may be used and actuated by any suitable mechanism. I have shown a circuit breaking switch of a simple type comprising a block 26 of hard rubber or other suitable, non-conducting material, secured as shown by a flush-headed bolt 27 to the cast web of the quadrant bracket 18. On this block 26 are secured two metal terminal plates 28 and 29. A fiber pinion gear member 30 having a metal pin 31 therein, serves to close the switch, bridging the circuit when passing between the parallel plates 28 and 29. The fiber pinion member is pivoted on a screw member 32 flush-headed at one end and slotted at the threaded end to engage with the web of the quadrant bracket 18. It is backed into place when making the assembly by use of a screw driver. This pin 32 also serves as one of the bolts to hold the switch cover 33 in place against the web of the bracket 18 in such manner as to completely guard the switch assembly against being tampered with or dismantled. The slotted end of the pin 32 is covered by the wings 34 and 35 which are cast with the lever 10. The bolts 35ª and 36 which hold the lever guard 33 are protected by wings 37 and 38 also cast with the lever 10. The circuit wires 39 and 40 are led to the switch through a metal conduit 41 which may be screwed into the cover guard 33 as indicated. The fiber pinion gear member 30 pivots on the pinion 32 so that the metal pin 31 sweeps the arc of the switch pieces 28 and 29 so as to leave the circuit broken when the lever is at either end of the quadrant 12 and closed when the lever is pushed far enough forward to release the brakes. The space 15 between the parts 13 and 14 permits the tooth 47 of the pawl 17 to operate freely between the parts 13 and 14. The tooth 48 of the pawl 17 engages with the notches 16 of the quadrant 12 and has its rake opposite to that of the tooth 47 of the pawl 17. Tooth 47 is to engage notch 49 when it is desired to push the lever to extreme forward position to lock same. This notch 49 is provided in a metal insert 50 riveted to the extreme forward end of the quadrant 12. The lever handle 51 is made in halves parting and faced on the line 52 and has at the extreme upper portion thereof, a lock housing 53 for any suitable lock mechanism of standard or special make with provision for a key hole 54. Thus by lock bar 55 being actuated by the key, the grip 56 is prevented from being raised and in this manner preventing the raising of the pawl 17 connected thereto, from any one of the notches 16 in the quadrant 12 or from the notch 49 of the quadrant 12. The lever handle 51 is slotted so as to secure free action of the handle grip 56 on its pivot 57 and is assembled on the top of the lever 10 by riveting the two halves together thereon. The pawl 17 is actuated by a pawl rod 58 and the spring 59 so as to cause the pawl to automatically engage with the notches of the quadrant. After the upper part of the handle is connected with the lower part as at 45, to insure against tampering with or dismantling the lever when in either of the locked positions, a pin 60 is secured in the side of pawl 17 so as to slide up and down in the slot 61. Thus, when the pawl 17 is raised, it disengages this pin 60 from the notch 62 as shown in Fig. 3. This notch 62 is formed by assembling the parts 63 and 64 to permit the tube to be screwed thereon. When the pawl 17 is at its lowest position engaging the quadrant notches, the pin 60 engages the slot 61 and the notch 62 simultaneously so as to prevent the tubular part of the handle being unscrewed or dismantled. To prevent access to it from the outside, a sleeve 66 is provided to completely cover the parts just described. This slot and associated operative parts may be otherwise protected as with a name or number plate electrically welded on tube 65 so as to cover the slot 61.

In operation, the driver of a vehicle equipped with my device, may upon stopping the machine in the street or elsewhere apply the key to the lock 53 after setting the emergency lever to apply the brakes, disengage the clutch, etc., thus completely locking the car against theft, as it is now impossible to move the lever, which by being pulled to brake setting position, has automatically shut off the gasolene and the electric ignition circuit as hereinabove described.

It is evident that a vehicle so locked cannot even be towed or pushed from where it was left by the driver. When it is desired to lock the vehicle in a garage, or elsewhere, against the same being driven by its own power, and not lock the wheels through the emergency brake, it is only necessary to push my type of lever to the extreme forward position on the quadrant, allow the tooth 47 of the pawl 17 to engage the notch 49 of the plate 50 and turn the key in the lock at the top of the lever. The vehicle is then locked so that it may be pushed or towed but not operated under its own power inasmuch as the gasolene is shut off and the ignition circuit is broken by the extreme forward position of the lever which operates the gasolene valve and the electric switch as hereinbefore described.

This arrangement is especially desirable when the car is left in the garage so that it can be moved out in case of fire and at the same time is locked against operating by its own power.

It will be seen that either the position of the lever which sets the emergency brakes or the extreme forward position will operate to shut off the gasolene supply and break the electric circuit. My device can be applied to any of the machines or vehicles for which it is intended to be used. I have spoken of its application to the lever which operates the emergency brakes as illustrative only, that being perhaps the most effective lever to which the same may be applied, but I do not wish to be limited to any particular lever or to any particular car or vehicle or any arrangement of details such as may be changed without deviating from the spirit of my invention.

Having thus described my invention, what I claim is:

1. In a device of the character set forth the combination with an emergency brake lever of an electric ignition switch and a valve in the line of gasolene supply both within the radius of action of the lever and simultaneously actuated thereby.

2. In a device of the class described, the combination with an emergency brake lever of an electric ignition switch and a valve in the line of fuel supply both within the operating radius of said switch and connected thereto by suitable means whereby the current and fuel supply are shut off by moving the lever in backward or forward position.

3. In a device of the character described the combination with an emergency brake lever of an electric ignition switch, a valve in the line of fuel supply, a quadrant and suitable connections between the lever, switch and valve for shutting off the fuel supply and breaking the electric circuit without setting the emergency brake lever.

4. In a device of the character set forth the combination with an emergency brake lever of an electric ignition switch, a valve in the line of fuel supply, both within the radius of action of the lever and simultaneously actuated thereby, and means for locking the lever in position.

5. In a device of the character described the combination with an emergency brake lever of an electric ignition switch, a valve in the line of fuel supply, a quadrant and suitable connections between the lever, switch and valve for shutting off the fuel supply and breaking the electric circuit without setting the emergency brake lever, and means for locking the emergency brake lever on the quadrant by locking the pawl of said lever into an engaged position on the quadrant.

6. An emergency brake lever fulcrumed so as to actuate a fuel supply valve and an electric ignition switch both in the circuit of supply to the engine and within the radius of action of the lever, a quadrant and suitable lock and key for securing the pawl of said lever in locked position on the quadrant.

7. An emergency brake lever fulcrumed so as to actuate a fuel supply valve and an electric ignition switch both in the circuit of supply to the engine and within the radius of action of the lever, a quadrant, means for securing the pawl of said lever in locked position on the quadrant and means for assembling the parts to prevent dismantling when locked in position on the quadrant.

In witness whereof, I hereunto subscribe my name to this specification in the presence of two witnesses.

CHARLES A. BICKFORD.

Witnesses:
  D. E. REESE,
  J. B. PURVES.